(12) United States Patent
Danev

(10) Patent No.: US 6,997,496 B2
(45) Date of Patent: Feb. 14, 2006

(54) RELEASABLE CONNECTION BETWEEN TWO ADJOINING BODY SHELL PARTS OF A VEHICLE BODY AND METHOD OF USING SAME

(75) Inventor: Dimitar Danev, Renningen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 87 days.

(21) Appl. No.: 10/661,585

(22) Filed: Sep. 15, 2003

(65) Prior Publication Data

US 2004/0074048 A1    Apr. 22, 2004

(30) Foreign Application Priority Data

Sep. 14, 2002  (DE) ............................... 102 42 787

(51) Int. Cl.
*F16B 5/00* (2006.01)
*B60R 11/00* (2006.01)
*B60R 19/24* (2006.01)
*B62D 27/00* (2006.01)

(52) U.S. Cl. ..................... 296/29; 403/240; 403/245; 403/381; 403/409.1; 403/DIG. 8; 403/DIG. 12; 403/335; 296/146.5; 296/191

(58) Field of Classification Search ............... 403/240, 403/245, 246, 320, 381, 409.1, DIG. 10–DIG. 12, 403/DIG. 8, 335, 337; 296/29, 191, 146.5, 296/146.7
See application file for complete search history.

(56) References Cited

U.S. PATENT DOCUMENTS

| | | | |
|---|---|---|---|
| 3,064,321 A | * 11/1962 | Rose | ............................ 403/231 |
| 3,730,568 A | * 5/1973 | Giovannetti | ................. 403/245 |
| 4,332,495 A | * 6/1982 | Burgers | ...................... 403/402 |
| 5,169,189 A | * 12/1992 | Haberle et al. | ............. 293/102 |
| 5,226,695 A | * 7/1993 | Flint et al. | ................... 296/191 |
| 5,590,975 A | * 1/1997 | Horntvedt | ............ 403/DIG. 12 |
| 5,642,557 A | * 7/1997 | Clews | ................. 403/DIG. 10 |
| 5,788,395 A | 8/1998 | Grieser et al. | .............. 403/231 |
| 6,390,718 B1 | * 5/2002 | Steege | ......................... 403/187 |
| 6,598,924 B1 | * 7/2003 | Palmer et al. | .............. 296/191 |

FOREIGN PATENT DOCUMENTS

| | | |
|---|---|---|
| CH | 444414 | 9/1967 |
| DE | 1 277 042 | 9/1968 |
| DE | 3145825 A * | 6/1982 |
| DE | 196 21 746 | 12/1996 |
| DE | 19912267 A1 | 8/1999 |

OTHER PUBLICATIONS

European Search Report EP 030/4908.

* cited by examiner

*Primary Examiner*—Daniel P. Stodola
*Assistant Examiner*—Ernesto Garcia
(74) *Attorney, Agent, or Firm*—Crowell & Moring LLP

(57) ABSTRACT

A releasable connection is provided between two adjoining components, particularly body shell parts of a vehicle body. A releasable connection ensuring an exact positioning of the two parts as well as a fast and simple mounting is provided. The releasable connection includes at least one base plate which is held in position on a first body shell component and has at least one projecting pin. A receiving device is fastened to an opposite second body shell component and has a rotatable slotted sleeve part. An end-side profiled head section of the at least one pin is guidable through openings of the second component, of the receiving device and of the sleeve part. As a result of radial rotation of the sleeve part about an angle $\alpha$, a fastening of the first and second body shell components with respect to one another takes place.

26 Claims, 4 Drawing Sheets

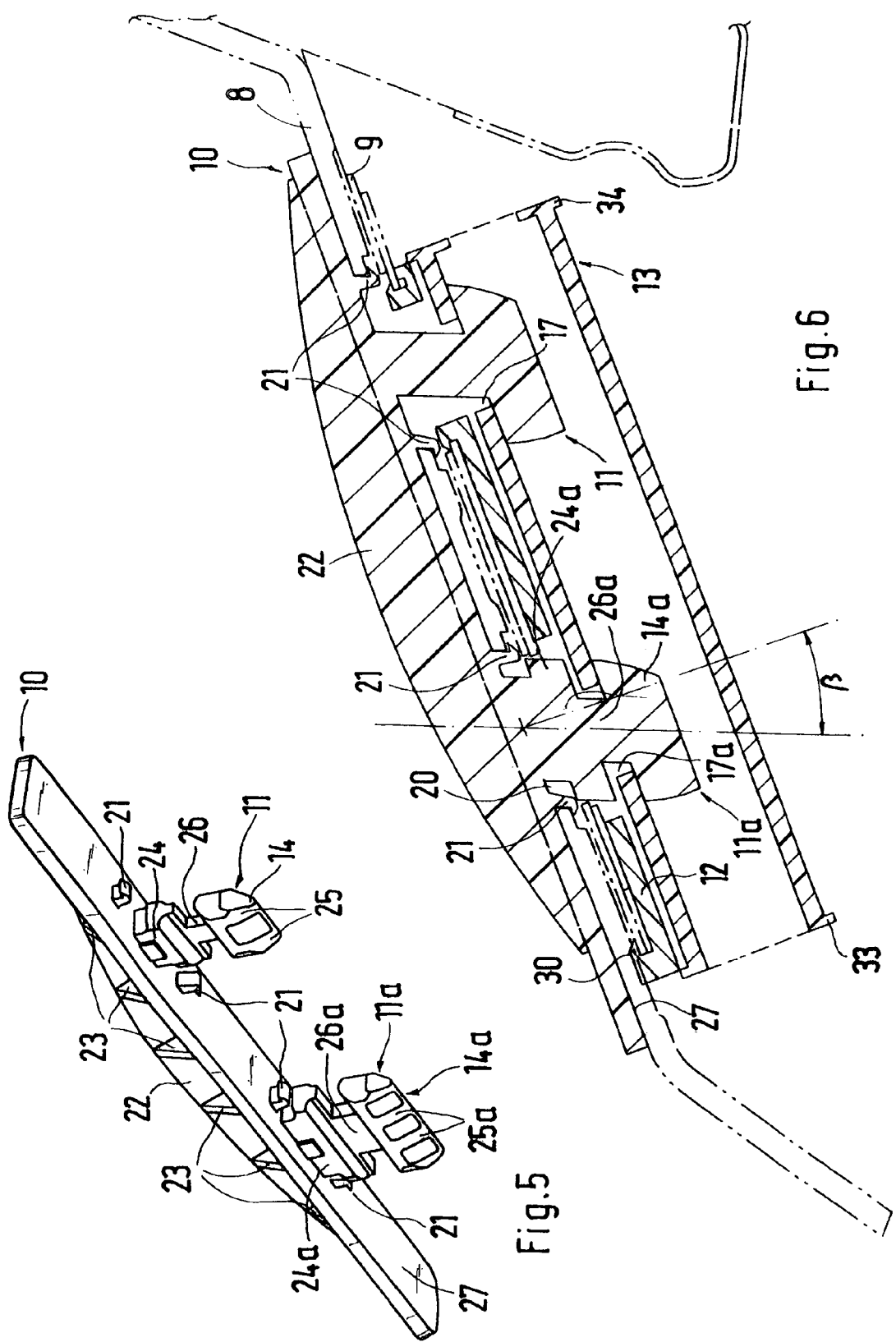

RELEASABLE CONNECTION BETWEEN TWO ADJOINING BODY SHELL PARTS OF A VEHICLE BODY AND METHOD OF USING SAME

This application claims the priority of 102 42 787.9, filed Sep. 14, 2002, the disclosure of which is expressly incorporated by reference herein.

BACKGROUND AND SUMMARY OF THE INVENTION

The invention relates to a releasable connection between two adjoining components, particularly body shell parts of a vehicle body.

In the field of vehicle construction, it is generally known to mutually connect adjoining components, particularly body shell parts of a vehicle body, by means of welding.

In addition, it is known from German Patent Document DE-PS 1 277 042 to mutually releasably connect adjoining body shell parts of a vehicle body. For this purpose, a weld nut equipped with an internal thread is provided on a component, into which weld nut a screw can be screwed which is connected with the other component. In order to avoid a rotating of the two components with respect to one another during the fastening, several screwed fastenings have to be provided which are arranged at a distance from one another.

This arrangement has the disadvantage that several screwed fastenings have to be provided which are situated side-by-side, for which considerable time is required.

It is an object of the invention to further develop a releasable connection between two adjoining components, particularly body shell parts of a vehicle body, such that, on the one hand, an exact mutual positioning of the two parts with a uniform seam is achieved and, on the other hand, a fast and rapid mounting of both parts is ensured.

According to the invention, this object is achieved by providing a releasable connection between two adjoining body shell part components of a vehicle body, wherein the releasable connection comprises at least one base plate which is held in use in position on a first component and has at least one projecting pin, and a receiving device which is fastened to a second component and has a rotatable slotted sleeve part, wherein an end-side profiled head section of the at least one pin is guidable through openings of the second component, of the receiving device and of the sleeve part, and wherein, as a result of radial rotation of the sleeve part about an angle α, a fastening of the first and second components with respect to one another takes place in certain preferred embodiments of the invention the releasable connection comprises at least two mutually spaced ones of said projecting pins which are arranged on a common base plate or on two separate base plates.

Important advantages achieved by means of the invention are that, as a result of the releasable connection according to the invention, the mounting expenditures, particularly the mounting time, are clearly reduced. The releasable connection, which include a base plate with a molded-on pin, a receiving device, and a rotatable sleeve part, can be rapidly and easily mounted and demounted. The projecting pins, which are provided in pairs on the base plate according to certain preferred embodiments of the invention, ensure a protection against torsion and, in addition, provide a precise positioning of the two components as well as a visually attractive appearance of the joint. As a result of an eccentric construction of the sleeve part according to certain preferred embodiments of the invention, the components can be mounted with a desired prestressing. The individual components of the releasable connection can be produced in a simple and cost-effective manner. In addition, the parts can be mounted in a simple manner so that the two components can be connected by means of snap-type connections according to certain preferred embodiments of the invention.

Other objects, advantages and novel features of the present invention will become apparent from the following detailed description of the invention when considered in conjunction with the accompanying drawings.

BRIEF DESCRIPTION OF THE DRAWINGS

FIG. 5 is a perspective view of the base plate with the molded-on pin of the embodiments of FIGS. 1–4;

FIG. 6 is a sectional view taken along Line VI—VI of FIG. 2 rotated by 90°.

DETAILED DESCRIPTION OF THE DRAWING

Figure 1:
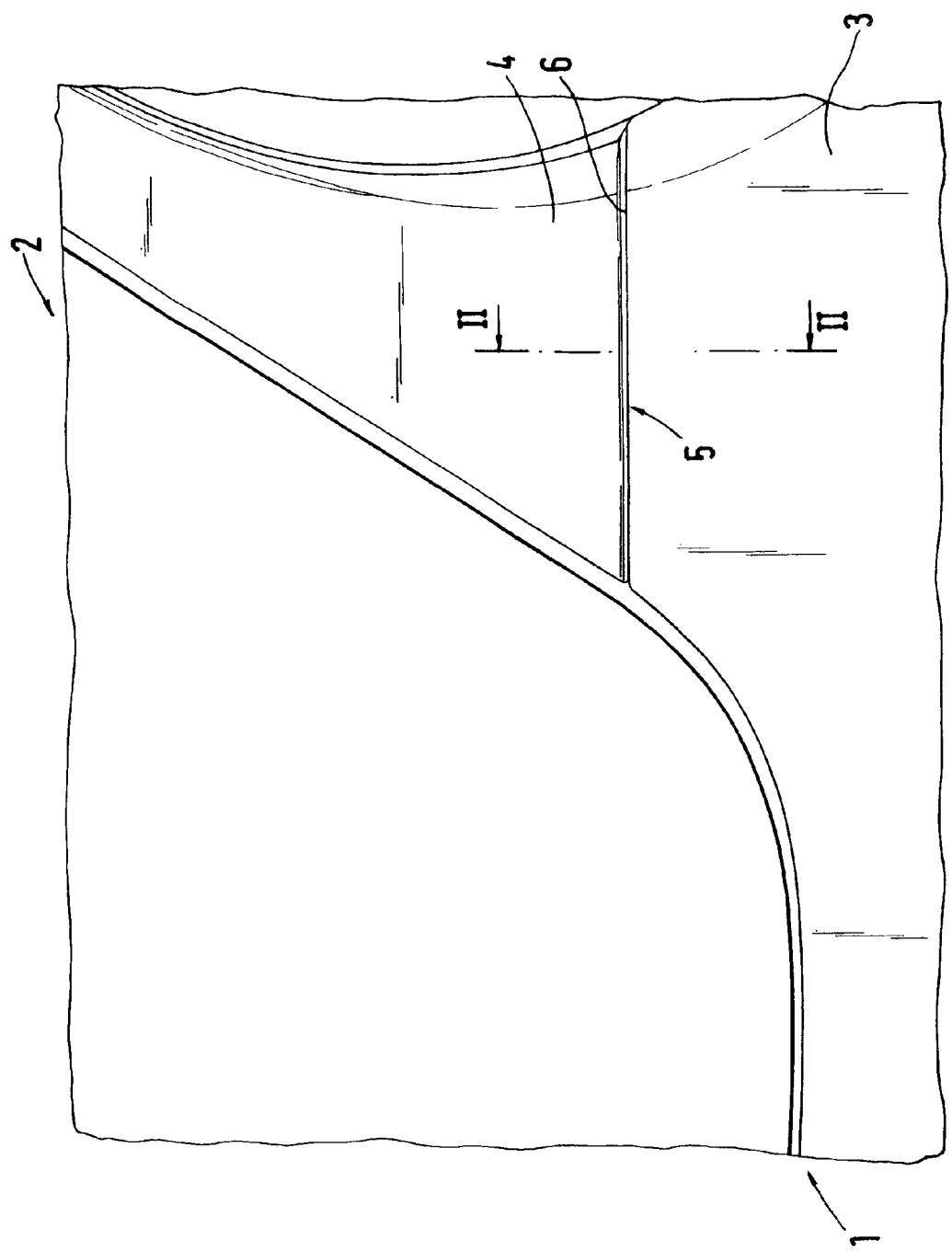
FIG. 1 is a partial top view diagonally from the front of adjoining body shell components of a passenger car constructed according to a preferred embodiment of the present invention.

FIG. 1 illustrates the front end area 1 of a passenger car 2, in which case adjoining components 3, 4 of the vehicle body are connected with one another by way of at least one releasable connection 5. The adjoining components 3, 4 are fitted to one another along a joint 6 and are formed by vehicle body shell parts of the passenger car 2. In the illustrated embodiment, the first component 3 is formed by a front-end covering, whereas the second component 4 represents a stationary forward fender.

In the joint connection area 7, the two components 3, 4 are equipped with bent-away inwardly directed flanges 8, 9 which rest against one another in areas. In this case, flange 8 is assigned to component 3, and flange 9 is assigned to component 4.

The releasable connection 5 comprises at least one base plate 10 which is held in position on a component 3 and has at least one projecting pin 11, 1a, and a receiving device 12 which is fastened to the other component 4 and has an interior locally slotted sleeve part 13. An end-side profiled head section 14, 14a of the pin 11, 1a can be guided through openings 15, 15a, 16, 16a, 17, 17a of the component 4, of the receiving device 12 and of the sleeve part 13. As a result of the radial rotation of the sleeve part 13 about an angle α, which, in this case, in areas, reaches behind a circular-arc-shaped area 18 of the head section 14, a fastening of the parts 10, 12 of the releasable connection takes place and, as a result, the components 3, 4 are tensioned with respect to one another.

Figure 2:
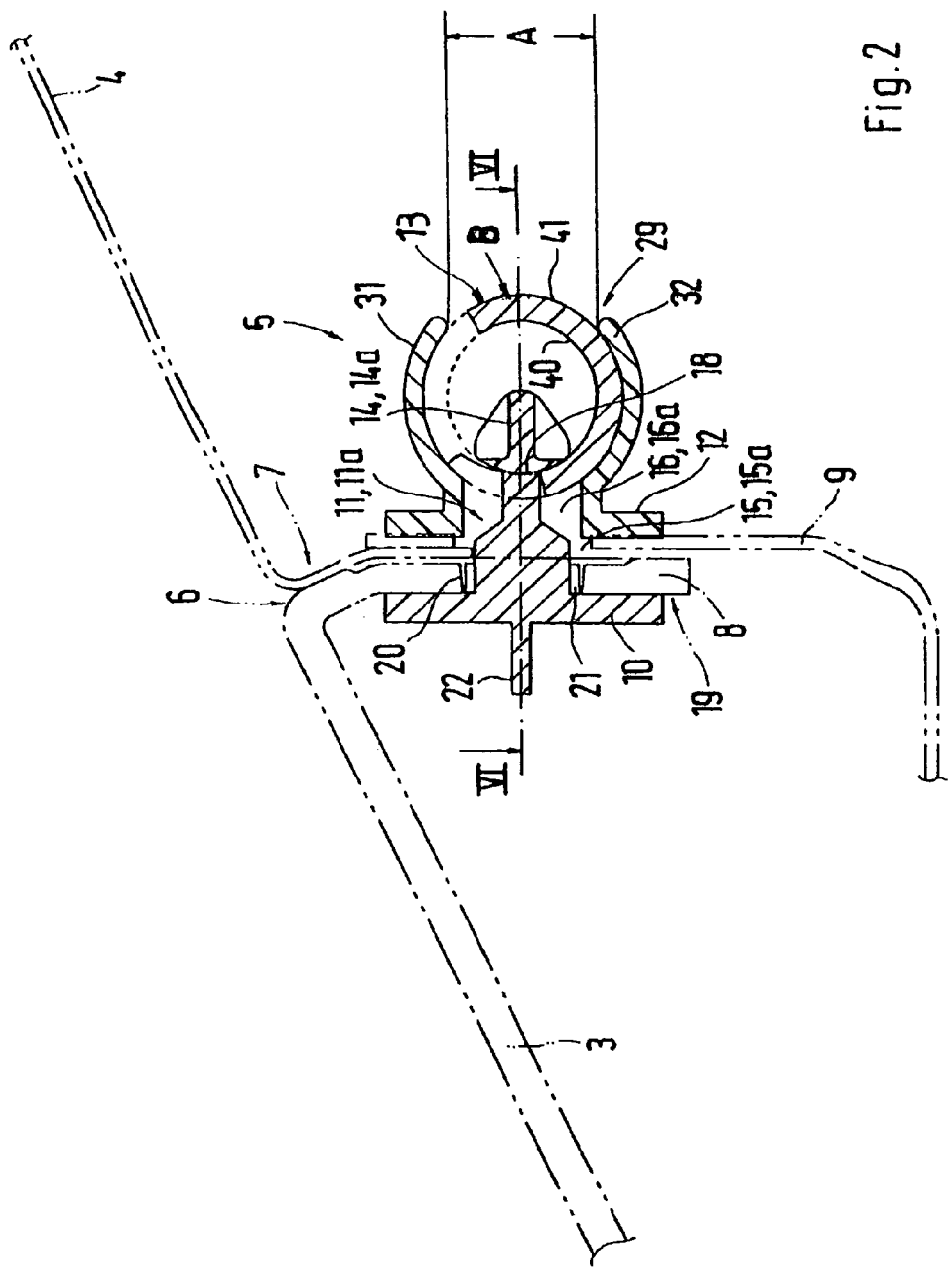
FIG. 2 is an enlarged and turned sectional view taken along Line II—II of FIG. 1.

The four-cornered base plate 10, which is elongated in the top view, in the embodiment shown, is premounted on the component 3. This may take place by snapping-on, gluing or the like. According to FIG. 2, the base plate 10 is guided from the side 19 of the flange 8 facing away from the component 4 to the component 3 and is supported on the flange 8. Rectangular openings 20 are provided on the flange 8 for the fastening of the base plate 10 as well as for the guiding-through of the at least one pin 11, 11a. In the embodiment shown, the base plate 10 is connected with the component 3 by means of snapping-on. Detent noses 21 constructed locally on the base plate 10 in this case reach behind edge sections of the openings 20 of the component 3.

According to FIG. 5, pairs of detent noses 21 are provided on the base plate 10, which detent noses lockingly interact with the component 3. The detent noses 21 extend on both sides of the injection-molded-on pins 11, 11a (FIG. 5). On the side facing away from the pins 11, 11a, the base plate 10 has a longitudinally extending bent supporting rib 22 as well as several transversely extending supporting ribs 23.

Each molded-on pin 11, 1a is composed of a foot section 24, 24a, of a head section 14, 14a provided with reinforcing ribs 25, 25a and of a web region 26, 26a situated in-between. The pins 11, 11a, which are connected to the base plate 10 approximately at a right angle, viewed in the top view, extend at an angle β with respect to the contact surface 27 of the base plate 10 (see FIG. 6). The two pins 11, 1a are constructed at a distance from one another on the elongated base plate 10. However, two separate base plates can also be used which each have a projecting pin 11.

The receiving device 12 is preferably premounted on the component 4 and comprises an approximately plate-shaped rectangular web 28 as well as two mutually spaced receiving sections 29 which are connected with the web 28. The elongated, locally slotted sleeve part 13 is received in the receiving sections 29. On the plate-shaped web 28, corresponding openings 16, 16a are provided in the area of the pins 11, 11a to be guided through, which openings 16, 16a are adapted approximately to the exterior shape of the base sections 24, 24a of the pins 11, 11a.

In its cross-sectional view, the web 28 has a slightly bent shape so that it rests only on the edge regions on the adjoining component 4. The receiving device 12 is connected with the adjoining component 4 also by means of a snapping-on. For this purpose, detent noses 30 are injection-molded-on locally at the plate-shaped web 28, which detent noses 30 in a locking manner reach behind edge sections of openings 15 provided at the flange 9.

Figure 4:
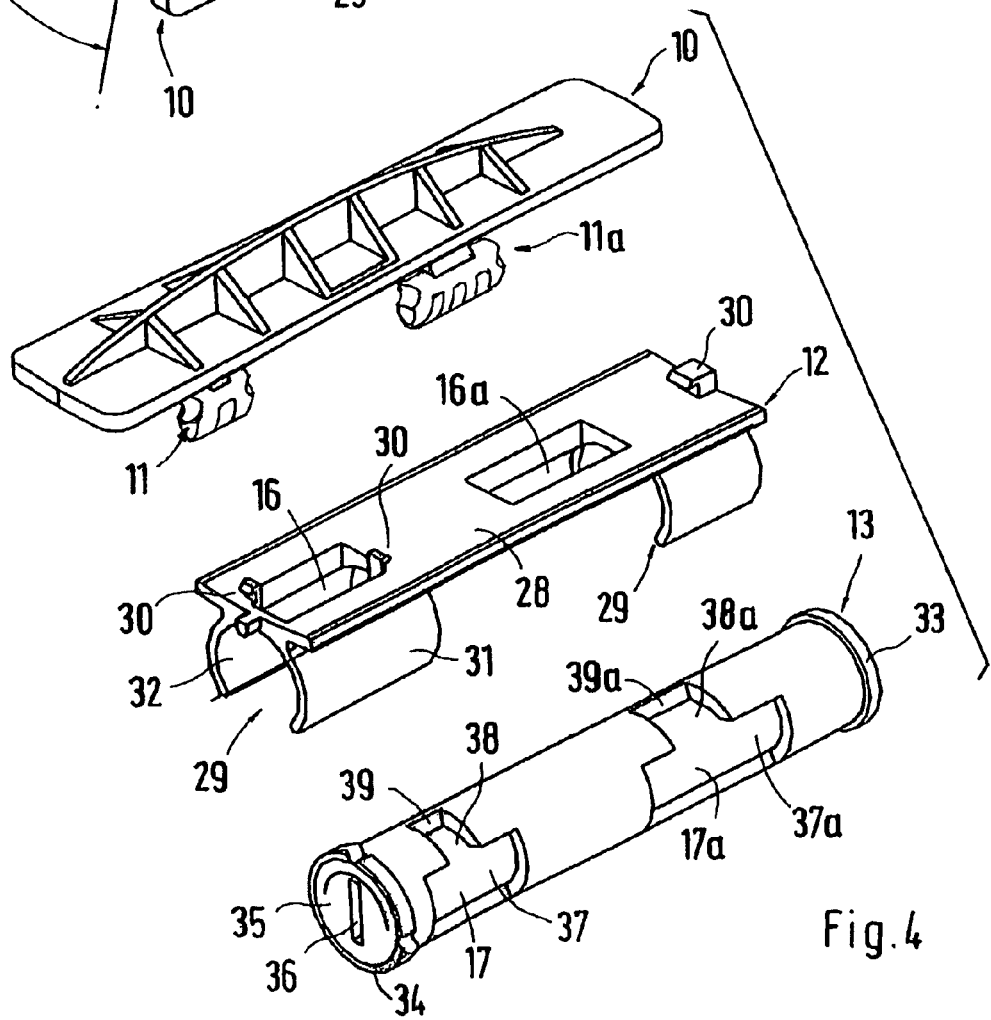
FIG. 4 is an exploded view of the individual components of the releasable connection of FIGS. 1–3.

Each receiving section 29 is formed by two circular-arc-shaped holding lips 31, 32 which are arranged above one another, the free ends of the holding lips 31, 32 extending at a distance A with respect to one another. The distance A is selected such that a lateral insertion of the sleeve part 13 in the direction R into the receiving sections 29 is ensured. The receiving sections 29 are arranged on both longitudinally extending ends of the receiving device 12. One end-side receiving section 29 is aligned with an opening 16 for the guiding-through of a pin 11; whereas the other receiving section 29 is arranged laterally offset with respect to the opening 16a of the other pin 11a (FIG. 4).

The elongated sleeve part 13 is formed by a hollow cylinder which has one radially projecting collar section 33, 34 respectively at the two face-side ends. The two collar sections 33, 34 fix the rotatable sleeve part 13 in the longitudinal direction and are each supported on the exterior sides of the receiving sections 29.

A face-side end of the sleeve part 13 is closed by means of a wall 35 and, in the center, has a narrow longitudinal slot 36 for introducing an auxiliary tool in order to rotate the sleeve part 13 in the desired manner. In the embodiment shown, the sleeve part 13 is rotated during the mounting about an angle α of approximately 90° by means of a screw driver. The openings 17, 17a on the sleeve part 13 each are constructed as so-called keyhole openings. Each keyhole opening comprises a relatively large introduction section 37, 37a through which one head section 14, 14a respectively of the assigned pin 11, 11a can be introduced into the interior of the sleeve part 13. One end of the introduction section 37, 37a is adjoined by a significantly smaller holding section 38, 38a which, viewed in its width, is slightly larger than the width of the web region 26, 26a of the corresponding pin 11, 11a. Viewed in the longitudinal direction of the sleeve part 13, the two pins 11, 11a may have the same or a different width. In the illustrated embodiment, the pins 11, 11a have a different width. The outer boundary 39, 39a of the holding section 38, 38a defines the mounted end position B of the sleeve part 13 after the rotation. The longitudinal slot 36 will then extend approximately parallel to the plane of the supporting rib 22. The components of the releasable connection 5 are produced of a suitable plastic material or of metal.

A defined prestressing of the releasable connection 5 is achieved in that the interior wall 40 of the sleeve part 13 extends eccentrically with respect to the outer wall 41. As a result, the sleeve part 13 has a virtual cam shape which causes a defined bracing of the two components 3, 4 with respect to one another during the rotating of the sleeve part 13 of the releasable connection (not shown in detail).

Figure 3:
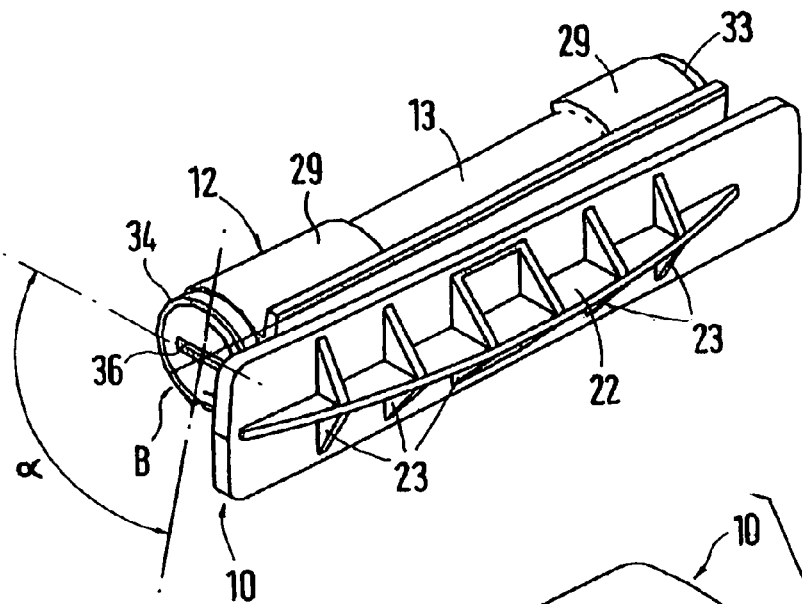
FIG. 3 is a perspective view of the releasable connection of FIGS. 1 and 2, shown in a mounted position.

The mounting of the releasable connection 5 takes place as follows: The base plate 10 with the molded-on pins 11, 11a is premounted on the component 3. The receiving device 12 with the sleeve part 13 is premounted on the component 4. The sleeve part 13 takes up such a position that the introduction sections 37, 37a are aligned in the direction of the pins 11, 11a of the component 3 which are to be guided through. Subsequently, the sleeve part 13 is rotated clockwise by approximately 90°, so that the sleeve part 13 reaches behind the circular-arc-shaped contact sections 18 of the head sections 14, 14a of the pins 11, 11a (mounting position B according to FIG. 3).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A releasable connection between two adjoining body skin parts of a vehicle body which are fitted together along a joint, said parts, in a common connection area, being provided with inwardly bent, projecting flanges oriented in the same direction, the flanges resting against one another in regions in the common connection area, the releasable connection comprising:

at least one base plate which is held in position at a first of the body skin parts and which has at least one projecting pin, and a receiving device which is fastened to a second of the body skin parts and which has a rotatable slotted sleeve, wherein the at least one base plate extends to the second of the body skin parts from a side of the flange facing away from the second of the body skin parts and is supported thereon, wherein the receiving device comprises an approximately plate-shaped web as well as two receiving sections which are arranged at a distance from one another and are connected with the web, within which the rotatable slotted sleeve is received, wherein an end-side profiled head section of the at least one projecting pin can be guided through openings of the first of the body skin parts, of the second of the body skin parts, of the receiving device, and of the rotatable slotted sleeve, and wherein, as a result of a radial rotation of the rotatable slotted sleeve through a selected angle, the sleeve reaches in regions behind a circular-arc-shaped area of the head section and fastening of the body skin parts together takes place.

2. The releasable connection according to claim 1, wherein the releasable connection comprises at least two of said projecting pins which are arranged on said at least one base.

3. The releasable connection according to claim 1, wherein said at least one base plate is held in position on the first of the body skin parts by way of a snap-on connection.

4. The releasable connection according to claim 2, wherein said at least one base plate is held in position on the first of the body skin parts by way of a snap-on connection.

5. The releasable connection according to claim 1, wherein the at least one base plate rests on a side of the first of the body skin parts which faces away from the second of the body skin parts, and wherein the at least one pin projects through an opening of the first of the body skin parts component.

6. The releasable connection according to claim 2, wherein the at least one base plate rests on a side of the first of the body skin parts which faces away from the second of the body skin parts, and wherein the at least one projecting pin projects through an opening of the first of the body skin parts.

7. The releasable connection according to claim 3, wherein the at least one base plate rests on a side of the first of the body skin parts which faces away from the second of the body skin parts, and wherein the at least one projecting pin projects through an opening of the first of the body skin parts.

8. The releasable connection according to claim 1, wherein the plate-shaped web is connected with the second of the body skin parts by means of snap-on connections.

9. The releasable connection according to claim 2, wherein the plate-shaped web is connected with the second of the body skin parts by means of snap-on connections.

10. The releasable connection according to claim 1, wherein each receiving section has two circular-arc-shaped holding lips which are arranged above one another, free ends of both holding lips being so far away from one another in a vertical direction that a lateral insertion of the sleeve part is ensured.

11. The releasable connection according to claim 2, wherein each receiving section has two circular-arc-shaped holding lips which are arranged above one another, free ends of both holding lips being so far away from one another in a vertical direction that a lateral insertion of the sleeve part is ensured.

12. The releasable connection according to claim 8, wherein each receiving section has two circular-arc-shaped holding lips which are arranged above one another, free ends of both holding lips being so far away from one another in a vertical direction that a lateral insertion of the sleeve part is ensured.

13. The releasable connection according to claim 1, wherein the sleeve part has radially projecting collar sections on its ends, and wherein the collar sections fix the sleeve part in the axial direction on the receiving device.

14. The releasable connection according to claim 2, wherein the sleeve part has radially projecting collar sections on its ends, and wherein the collar sections fix the sleeve part in the axial direction on the receiving device.

15. The releasable connection according to claim 8, wherein the sleeve part has radially projecting collar sections on its ends, and wherein the collar sections fix the sleeve part in the axial direction on the receiving device.

16. The releasable connection according to claim 10, wherein the sleeve part has radially projecting collar sections on its ends, and wherein the collar sections fix the sleeve part in the axial direction on the receiving device.

17. The releasable connection according to claim 1, wherein at least one face-side end of the sleeve is closed by a wall, and wherein a narrow longitudinal slot for introducing an auxiliary tool is provided at the wall in order to rotate the sleeve.

18. The releasable connection according to claim 2, wherein at least one face-side end of the sleeve is closed by a wall, and wherein a narrow longitudinal slot for introducing an auxiliary tool is provided at the wall in order to rotate the sleeve.

19. The releasable connection according to claim 3, wherein at least one face-side end of the sleeve part is closed by a wall, and wherein a narrow longitudinal slot for introducing an auxiliary tool is provided at the wall in order to rotate the sleeve.

20. The releasable connection according to claim 4, wherein at least one face-side end of the sleeve is closed by a wall, and wherein a narrow longitudinal slot for introducing an auxiliary tool is provided at the wall in order to rotate the sleeve.

21. The releasable connection according to claim 5, wherein at least one face-side end of the sleeve is closed by a wall, and wherein a narrow longitudinal slot for introducing an auxiliary tool is provided at the wall in order to rotate the sleeve.

22. The releasable connection according to claim 8, wherein at least one face-side end of the sleeve is closed by a wall, and wherein a narrow longitudinal slot for introducing an auxiliary tool is provided at the wall in order to rotate the sleeve.

23. The releasable connection according to claim 10, wherein at least one face-side end of the sleeve is closed by a wall, and wherein a narrow longitudinal slot for introducing an auxiliary tool is provided at the wall in order to rotate the sleeve.

24. The releasable connection according to claim 13, wherein at least one face-side end of the sleeve is closed by a wall, and wherein a narrow longitudinal slot for introducing an auxiliary tool is provided at the wall in order to rotate the sleeve.

25. The releasable connection according to claim 1, wherein, for achieving a defined prestressing of the releasable connection, the sleeve has an eccentric construction.

26. The releasable connection according to claim 23, wherein, for achieving a defined prestressing of the releasable connection, the sleeve part has an eccentric construction.

* * * * *